US009821635B2

United States Patent
Kaneko et al.

(10) Patent No.: US 9,821,635 B2
(45) Date of Patent: Nov. 21, 2017

(54) APPARATUS FOR CONTROLLING IN-VEHICLE HEATER

(71) Applicants: SANDEN CORPORATION, Isesaki-shi (JP); HONDA MOTOR CO., LTD., Minato-ku (JP)

(72) Inventors: Shunsuke Kaneko, Isesaki (JP); Kazuyasu Ushigome, Isesaki (JP); Jyouji Arai, Isesaki (JP); Soichi Mizuno, Wako (JP); Mamoru Fujita, Wako (JP); Naoki Inoue, Wako (JP)

(73) Assignees: SANDEN HOLDINGS CORPORATION, Isesaki-shi (JP); HONDA MOTOR CO., LTD., Tokyo (JP)

( * ) Notice: Subject to any disclaimer, the term of this patent is extended or adjusted under 35 U.S.C. 154(b) by 786 days.

(21) Appl. No.: 14/351,823

(22) PCT Filed: Oct. 11, 2012

(86) PCT No.: PCT/JP2012/076340
§ 371 (c)(1),
(2) Date: Apr. 14, 2014

(87) PCT Pub. No.: WO2013/054853
PCT Pub. Date: Apr. 18, 2013

(65) Prior Publication Data
US 2015/0122899 A1    May 7, 2015

(30) Foreign Application Priority Data
Oct. 12, 2011    (JP) .................. 2011-224687

(51) Int. Cl.
*B60H 1/00*    (2006.01)
*H05B 1/02*    (2006.01)
*B60H 1/22*    (2006.01)

(52) U.S. Cl.
CPC ....... *B60H 1/00985* (2013.01); *B60H 1/2221* (2013.01); *H05B 1/0236* (2013.01)

(58) Field of Classification Search
CPC . B60H 1/00985; B60H 1/2221; H05B 1/0236
See application file for complete search history.

(56) References Cited

U.S. PATENT DOCUMENTS 4,882,909 A * 11/1989 Terauchi ............. F04B 27/1804
                                                      417/270
5,229,579 A *  7/1993 Ingraham ............. B60H 1/2218
                                                      219/202

(Continued)

FOREIGN PATENT DOCUMENTS

JP    10-157446    6/1998
JP    2002-100457    4/2002

(Continued)

OTHER PUBLICATIONS

Office Action dated Jun. 16, 2015 which issued in the corresponding Japanese Patent Application No. 2011-224687.

*Primary Examiner* — Avinash Savani
*Assistant Examiner* — Deepak Deean
(74) *Attorney, Agent, or Firm* — Cozen O'Connor

(57) ABSTRACT

In order to perform overheating protection of a controller for water-heating heaters 3A and 3B for in-vehicle heating, an energization circuit for a heater 3 (3A, 3B) includes IGBTs 11 and 12 as switching devices that are disposed therein to be in series with the heater 3, and a first temperature sensor (first thermistor) 21 which measures temperature of these IGBTs 11, 12. A comparator 25 is provided to transmit a signal when the temperature of the IGBTs 11, 12 is equal to or greater than a predetermined temperature. Then, the IGBTs 11, 12 can be forcibly turned OFF via the IGBT (Continued)

driver 13 in response to a signal from the comparator 25 without a microprocessor 14 intervening therebetween.

2 Claims, 3 Drawing Sheets

(56) References Cited

U.S. PATENT DOCUMENTS

| | | | | |
|---|---|---|---|---|
| 6,552,293 | B2* | 4/2003 | Moro | B23K 3/033 |
| | | | | 219/56.21 |
| 6,894,465 | B2* | 5/2005 | Sutardja | H02M 1/088 |
| | | | | 323/268 |
| 7,369,378 | B2* | 5/2008 | Sunaga | H02P 7/29 |
| | | | | 361/118 |
| 8,263,912 | B2* | 9/2012 | Watanabe | H03K 7/08 |
| | | | | 219/482 |
| 9,036,316 | B2* | 5/2015 | Satoh | H02H 5/047 |
| | | | | 180/65.275 |
| 2006/0052906 | A1* | 3/2006 | Kates | H04L 47/10 |
| | | | | 700/295 |
| 2008/0002326 | A1 | 1/2008 | Watanabe | |

FOREIGN PATENT DOCUMENTS

| | | |
|---|---|---|
| JP | 2002-324653 | 11/2002 |
| JP | 2008-35684 | 2/2008 |
| JP | 2010-14864 | 1/2010 |

* cited by examiner

APPARATUS FOR CONTROLLING IN-VEHICLE HEATER

RELATED APPLICATIONS

This is a U.S. National stage of International application No. PCT/JP2012/076340 filed on Oct. 11, 2012.

This patent application claims the priority of Japanese application no. 2011-224687 filed Oct. 12, 21011, the disclosure content of which is hereby incorporated by reference.

TECHNICAL FIELD

The present invention relates to an apparatus for controlling an in-vehicle heater that heats a heating medium for heating.

BACKGROUND ART

Electric vehicles and hybrid vehicles are provided with a hot-water heating device for heating the passenger compartment. Specifically, they are provided with a water circulation passage, at one position of which water is heated to be hot water by a heater (water-heating heater) and at another position (downstream side) of which heat exchange is performed by a heat exchanger between the hot water and air blown to the passenger compartment, to thereby obtain hot air for heating the passenger compartment.

The power supply of such a heater is a high-voltage power supply, and thus, the heater is used at high voltage and high current. Therefore, there is a possibility that abnormal overheating is generated in the heater for some reason, and thus, overheating protection is required.

In Patent Document 1, the temperature of a heater (including the temperature of hot water obtained by the heater) is measured, and if the temperature of the heater exceeds a predetermined value, forcibly turn off a switch for ON and OFF of the voltage supplying to the heater and maintain such an OFF-state.

In Patent Document 2, a temperature fuse is disposed in the heater energizing circuit so as to be in series with the heater, and the temperature fuse is melted when the heater is abnormally overheated. When high power is applied thereto, the temperature fuse does not have sufficient reliability, and thus, multiple heaters are connected in parallel, and the temperature fuse is provided for each heater so as to operate the temperature fuses at low power (low current).

CITATION LIST

Patent Documents

[Patent Document 1] Japanese Patent No. 3369881
[Patent Document 2] Japanese Laid-open (Kokai) Patent Application Publication No. 2002-324853

SUMMARY OF THE INVENTION

Problems to be Solved by the Invention

In the technique disclosed in Patent Document 1, an occurrence of abnormal overheating is determined by measuring the temperature of the heater (including the temperature of hot water obtained by the heater). In the case of controlling energization of the heater using a switching device such as an IGBT, such a switching device may be abnormally overheated prior to the detection of abnormal overheat of the heater, and thus, countermeasure for this is further required.

In the case of detecting abnormal overheating of the heater and controlling the heater to forcibly turn-off by a microprocessor, if control of the microprocessor is lost for some reason, no means is available for turning off the heater.

In the technique disclosed in Patent Document 2, a temperature fuse operates under a low-power (low current) condition, and thus, it is necessary to choose a heater with a low-power density and a heater with a high-power density cannot be used. This causes a disadvantage when upscaling the heater, and accordingly upscaling of a casing to accommodate the heater.

In view of the abovementioned problems, it is an object of the present invention to provide an apparatus for controlling an in-vehicle heater to further deal with overheating protection when the microprocessor malfunctions.

Means for Solving the Problems

An apparatus for controlling an in-vehicle heater according to the present invention includes, as a prerequisite, a heater that generates heat by energization to heat a heating medium for heating; a switching device that is disposed in an energization circuit for the heater to be in series with the heater, the switching device being capable of turning energization ON and OFF; a driver that drives ON and OFF the switching device; and a microprocessor that generates an instruction signal to the driver in response to a heating request.

Then, the apparatus for controlling in-vehicle heater further includes: a first temperature sensor that measures temperature of the switching device; and a comparator that receives a signal from the first temperature sensor and transmits a signal when temperature of the switching devices is equal to or greater than a predetermined temperature, and the device for controlling an in-vehicle heater is configured so that the switching device is forcibly turned OFF via the driver in response to the signal from the comparator.

Effect of the Invention

The present invention is configured to measure temperature of the switching device, and in a case in which the switching device is overheated, the switching device is forcibly turned of to protect a switching device requiring more stringent protection, which can be protected preferentially (immediately). Needless to say, overheat protection for the switching device is performed, and at the same time, overheat protection for the heater can be performed.

Since the comparator is provided as a separate circuit configuration from the microprocessor, even when control of the microprocessor is lost for some reason, overheating protection is enabled.

MODE FOR CARRYING OUT THE INVENTION

Hereinbelow, embodiments of the present invention will be described in detail.

An in-vehicle heater according to the present invention is configured to generate heat by energization to heat a heating medium for heating. As the heat medium, water (including wafer mixed with antifreeze or the like) is typically used. In the following embodiments, water is used as a beating medium.

Figure 1:
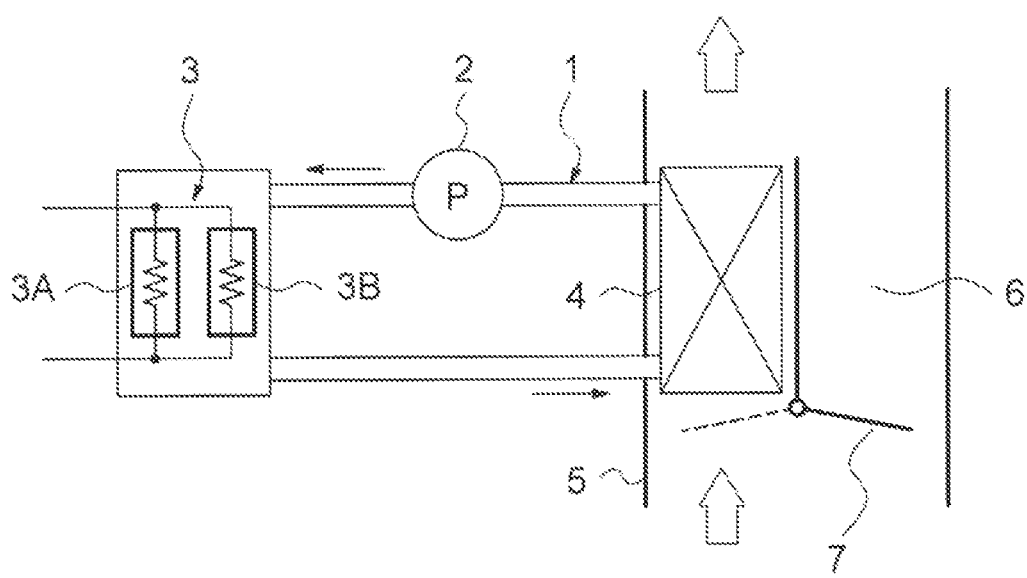
FIG. 1 is a conceptual view of an in-vehicle heater including a water-heating heater according to one embodiment of the present invention.

FIG. 1 is a conceptual view of art in-vehicle heater including a water-heating heater according to one embodiment of the present invention.

A circulation passage 1 of water as a heating medium is provided, and water is circulated by a pump 2.

At one position of the circulation passage 1, a heater (water-beating heater) 3 is provided. The heater 3 heats wafer flowing through the circulation passage 1, thus yielding hot water. The heater 3 of the present embodiment includes two heaters 3A and 36 electrically connected in parallel.

At another position (downstream side of the heater 3) of the circulation passage 1, a heat exchanger 4 is provided. The heat exchanger 4 is disposed in an airflow duct 5 from which conditioned air is blown into the passenger compartment, and performs heat exchange between hot water and air to thereby warm air, thus yielding hot air for heating the passenger compartment. The airflow duct 5 internally includes a bypass passage 6 to bypass the heat exchanger 4, and includes an air mix damper 7 to control the flow of air.

Figure 2:
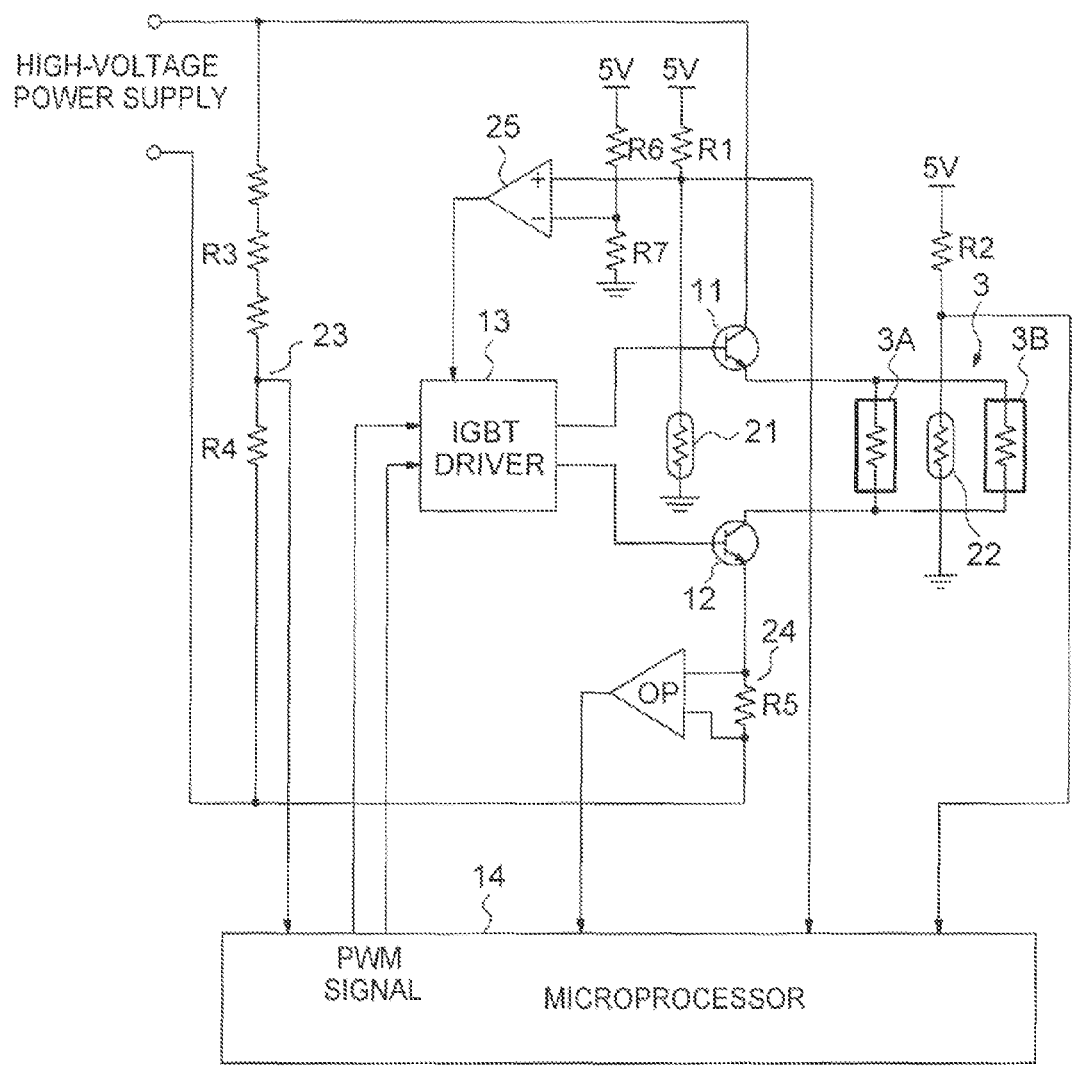
FIG. 2 is a circuit configuration view of an apparatus for controlling a wafer-heating heater according to one embodiment of the present invention.

FIG. 2 is a circuit configuration view of an apparatus for controlling a water-heating heater according to one embodiment of the present invention.

An energization circuit for the heater 3 (3A, 3B) applies voltage from a high-voltage power supply to the two heaters 3A and 3B connected in parallel.

This energization circuit includes, in series with the heater 3 (3A, 3B), insulated-gate bipolar transistors (IGBTs) 11 and 12 as switching devices that are disposed closer to the power supply than the heater 3 and closer to the ground than the beater 3, respectively. Upon receiving a signal at their gates, the IGBTs 11 and 12 can turn energization ON and OFF, and the gates of the IGBTs 11 and 12 are connected to two output terminals of an IGBT driver 13, respectively.

The IGBT driver 13 has two input terminals and two output terminals, and is capable of driving ON and OFF the two IGBTs 11 and 12 individually in response to output signals based on corresponding input signals. The two input terminals of the IGBT driver 13 are connected to two output terminals of a microprocessor (CPU) 14, respectively.

The microprocessor 14 generates an instruction signal to the IGBT driver 13 in response to a heating request. That is, the microprocessor 14 determines the ON-duration ratio of the heater 3 based on the heating request and outputs a PWM signal which corresponds to the ON-duration ratio, and thus, controls the ON-duration ratio of the IGBT transistors 11 and 12 via the IGBT driver 13 and controls the temperature (temperature of the resulting hot wafer) of the heater 3.

In order to perform heating control based on the heating request, overheating protection, and the like, the microprocessor 14 receives signals from various sensors (a first temperature sensor, a second temperature sensor, a voltage sensor and a current sensor).

A first temperature sensor 21 measures the temperature of the switching devices 11 and 12, and a single first temperature sensor 21 is provided for the two switching devices 11 and 12 at a position at which the temperature can be measured. Specifically the first temperature sensor 21 includes a first thermistor (21) so that a resistor R1 and the first thermistor 21 are disposed in series between a constant voltage power supply (denoted as "5V" in FIG. 2) and the ground. Then terminal voltage V1 of the first thermistor 21 is input into the microprocessor 14 as voltage corresponding to the temperatures.

A second temperature sensor 22 measures the temperature of the heater 3 (including temperature of hot water obtained by the heater 3), and a single second temperature sensor 22 is provided for the two heaters 3A and 3B at a position at which these temperatures are measured (for example, between the two heaters 3A and 3B, at an outlet part for hot water of a casing which accommodates these heaters 3A and 3B). Specifically, the second temperature sensor 22 includes a second thermistor (22) so that a resistor R2 and the second thermistor 22 are disposed in series between the constant voltage power supply and the ground. Then terminal voltage V2 of the second thermistor 22 is input into the microprocessor 14 as voltage corresponding to the temperatures.

A voltage sensor 23 measures voltage (power supply voltage) applied to the heater 3 (3A, 3B), and includes voltage-dividing resistors R3 and R4 that are disposed in series between the power supply and the ground of the high-voltage power supply. Terminal voltage V3 of the resistor R4 on the ground side is input into the microprocessor 14 as a value corresponding to power-supply voltage. Needless to say, the voltage-dividing resistors R3 and R4 have the relationship R3>>R4.

A current sensor 24 measures current flowing through the heater 3 (IGBTs 11, 12), and includes a resistor R5 that is disposed in series and is closer to the ground than the IGBT 12 of the energization circuit of the heater 3, and an operational amplifier OP which measures a potential difference across the resistor R5. Output (potential difference $\Delta V$) of the operational amplifier OP is input info the microprocessor 14. The microprocessor 14 can measure current $i=\Delta V/R5$ based on the potential difference $\Delta V$ and the resistance value of the resistor R5.

The microprocessor 14 has a function (forcibly turning OFF instruction means or forcibly turning OFF instruction unit) by software to issue an instruction to forcibly turn OFF the IGBT driver 13 if any one of the temperature of the IGBTs 11, 12, the temperature of the heater 3 and the voltage and the current to the beater 3 exceeds their corresponding predetermined values.

That is, the microprocessor 14 measures the temperature of the IGBTs 11, 12, the temperature of the heater 3 and the voltage and the current to the heater 3 based on signals input from the first temperature sensor (first thermistor) 21, the second temperature sensor (second thermistor) 22, the voltage sensor 23 and the current sensor 24.

Then, if the temperature of the IGBTs 11, 12 exceeds a predetermined value, the temperature of the heater 3 exceeds a predetermined value, the voltage applied to the heater 3 exceeds a predetermined value, or the current flowing through the heater 3 exceeds a predetermined value, the microprocessor 14 issues a forcibly turning OFF instruction to the IGBT driver 13. That is, the output of a PWM signal is stopped. As a result, the IGBTs 11, 12 are forcibly turned OFF, so that energization to the heater 3 (3A, 3B) is stopped. Thus, overheating protection for the IGBTs 11, 12 and the heater can be performed.

Such overheating protection, however, is performed by the microprocessor 14, and thus, if the microprocessor 14 malfunctions, the desired object cannot be achieved. Then, the following countermeasure is taken.

Referring to FIG. 2, a comparator (comparison circuit) 25 is provided, to which a signal from the first temperature sensor (first thermistor) 21 for measuring temperature of the IGBTs 11, 12 as switching devices is input, and the comparator 25 generates a signal when the temperature of the IGBTs 11, 12 exceeds a predetermined temperature.

The comparator 25 has two input terminals, and one of the input terminals is a positive side input terminal, to which terminal voltage (voltage-dividing voltage between the resistor R1 and the thermistor 21) V1 of the first thermistor 21 is input, and the other terminal is a negative side input terminal to which predetermined voltage V4 obtained by voltage-dividing by resistors R6, R7 is input.

The comparator 25 has an output terminal that is connected to a forcibly stopping port of the IGBT driver 13, and is configured so that a signal from the comparator 25 forcibly turns OFF the IGBTs 11, 12 via the IGBT driver 13.

Therefore, if the temperature of the IGBTs 11, 12 rises abnormally, the resistance value of the first thermistor 21 decreases. As a result, the terminal voltage V1 of the first thermistor 21 that is input to the positive side input terminal of the comparator 25 drops to fall below the predetermined voltage input to the negative side input terminal. Accordingly, the output of the comparator 25 reaches the L level.

Since the output terminal of the comparator 25 is connected to the forcibly stopping port of the IGBT driver 13, the IGBT driver 13 stops driving of the IGBTs 11, 12 in response to the L level signal.

Figure 3:
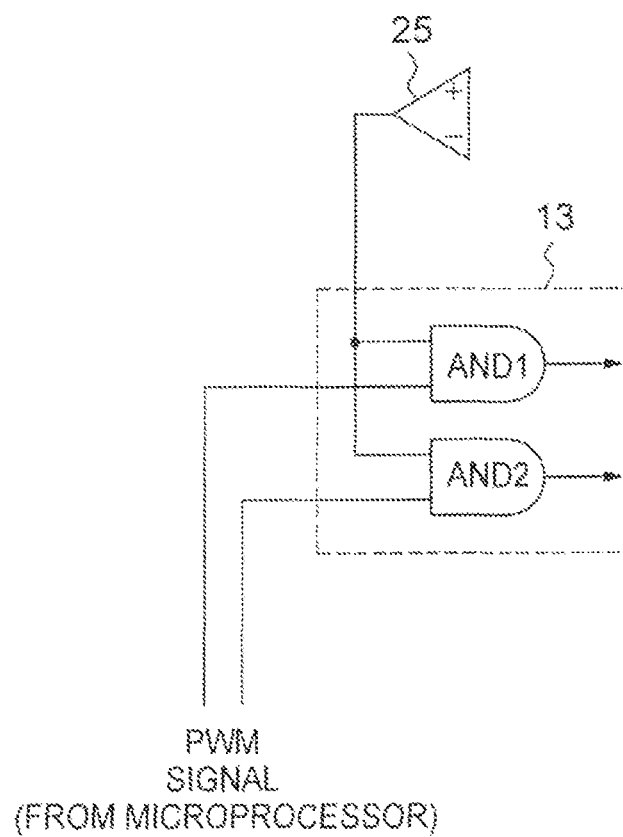
FIG. 3 is a view illustrating a specific example of a forcibly stopping port part of an IGBT driver.

FIG. 3 illustrates a specific example of a forcibly slopping port part of the IGBT driver 13, which is configured to transmit a PWM signal from the microprocessor 14 side to the IGBTs 11, 12 side via AND circuits, AND1, AND2 (one input terminal of AND1 and AND2). The output terminal of the comparator 25 is connected to the other input terminal of the AND circuits AND1, AND2. Therefore, when the output of the comparator 25 reaches the L level, the output of the AND circuits AND1, AND2 reaches the L level, so that the transmission of a PWM signal to the IGBTs 11, 12 side is stopped, and the driving of the IGBTs 11, 12 is stopped.

Therefore, the IGBTs 11, 12 are forcibly turned OFF, and energization to the heater 3 (3A, 3B) is stopped. In this way, it is possible to perform overheat protection for the IGBTs 11, 12 and the heater 3. Even when the microprocessor 14 malfunctions, overheat protection can be securely executed.

The present embodiment is configured to measure temperature of the IGBTs 11, 12 as switching devices that drive the heater 3 at high voltage and high current, and when the switching devices is overheated, forcibly turning off is performed. In this way, the IGBTs 11, 12 requiring more stringent protection can be protected preferentially (immediately). Needless to say, overheating protection for the IGBTs 11, 12 is performed, and at the same time, overheating, protection for the heater 3 can be performed.

Since the comparator 25 is provided as a separate circuit configuration from the microprocessor 14, even when the microprocessor 14 malfunctions for some reason, overheating protection is enabled. That is, in the case of using the microprocessor 14, if the microprocessor 14 outputs an erroneous signal or if the microprocessor 14 itself is out of control due to a breakdown or malfunction, there is a possibility that the switching device cannot be turned OFF. Even in such a case, the switching device can be securely turned off. Since the circuit is configured with a versatile device including the comparator 25, it can be achieved at relatively low cost.

The following advantageous effects can be obtained as compared with the case of using a temperature fuse. Instead of the device to shut off physically as in a temperature fuse, an electronic circuit is used, and thus, has low malfunction probability and has high precision. Although the temperature fuse has difficulty in resumption after shut-off performed once, it is possible to repeatedly shut off the electronic circuit. Since the heater can be used under high voltage and high current conditions, a heater with a high-power density can be chosen, and thus, the heater can be reduced in size.

According to the present embodiment, when the microprocessor 14 operates normally, if the temperature of the IGBTs 11, 12, as switching devices, exceeds a predetermined value, the temperature of the heater 3 exceeds a predetermined value, the voltage (power supply voltage) applied to the heater 3 exceeds a predetermined value, or the current flowing through the heater 3 (or IGBTs 11, 12) exceeds a predetermined value, a forcibly turning OFF instruction can be issued to the IGBT driver 13 for overheating protection.

In the present embodiment, the two IGBTs 11, 12, as switching devices, are disposed in series with the heater 3 on the power-supply side and the ground side of the heater 3, the single first temperature sensor (first thermistor) 21 is provided at a position at which temperature of the two IGBTs 11, 12 can be measured, and the single comparator 25 is provided which corresponds to the single first temperature sensor 21. In this way, it is sufficient to add the single comparator 25 for the two IGBTs 11, 12, and thus, an increase in cost can be reduced.

Since the energization circuit includes the two switching devices (IGBTs 11, 12), the following control is enabled. First, one of the switching devices (IGBT 11) may be used for PWM control and the other switching device (IGBT 12) may be used for shut-off. Alternatively, both of the switching devices (IGBTs 11, 12) may be used for PWM control and for shut-off, whereby a double system can be configured. In the latter case, one of them may be turned ON at the OFF timing of the original PWM control, whereby failure diagnosis can be performed.

The following describes a modified embodiment.

The embodiment described above includes the heater 3 made up of the two heaters 3A, 3B that are connected in parallel, and the heater 3 may include one heater. In the case of including the two heaters 3A, 3B that are connected in parallel, a switching device (IGBT) is provided for each of the heaters 3A and 3B, and a first temperature sensor (first thermistor) and a comparator may be provided for each switching device (IGBT).

Alternatively, two first temperature sensors (first thermistors) 21, two second temperature sensors (second thermistors) 22, two voltage sensors 23, two current sensors 24 and the like may be provided for a double system, so that sensor values from them can be compared to perform failure diagnosis of each sensor. When two first temperature sensors (first thermistors) 21 are provided for a double system, a comparator may be provided corresponding to each of the sensors, and forcibly turning OFF may be performed based on a signal from one of the comparators.

A latch circuit may be provided on the output side of the comparator 25, and after the output of the comparator 25 turns OFF, the OFF state may be held until the microprocessor 14 resets. In that case, if the microprocessor 14 malfunctions, the OFF state can foe held without resetting, and thus, the control can be performed more safely.

As mentioned above, while only a select embodiment has been chosen to illustrate and describe the present invention, it will be apparent to those skilled in the art from this disclosure that various changes and modifications can be made herein without departing from the scope of the invention as defined in the appended claims.

REFERENCE SIGNS LIST

1 Water circulation passage
2 Pump
3 (3A, 3B) Heater
4 Heat exchanger
5 Airflow duct
8 Bypass passage
7 Air mix damper
11, 12 IGBTs as switching devices
13 IGBT driver
14 Microprocessor
21 First temperature sensor (first thermistor)
22 Second temperature sensor (second thermistor)
23 Voltage sensor
24 Current sensor
25 Comparator

The invention claimed is:

1. An apparatus for controlling a heater in a vehicle, the heater generating heat by energization to heat a heating medium for heating, the apparatus comprising:
  two switching devices that are disposed in an energization circuit for the heater to be in series with the heater on a power-supply side and on a ground side of the heater, the two switching devices being capable of turning energization ON and OFF;
  a driver that drives ON and OFF the two switching devices; and
  a microprocessor that generates an instruction signal to the driver in response to a heating request;
  a single first temperature sensor that is provided at a position at which temperature of the two switching devices can be measured and measures the temperature of the two switching devices; and
  a single comparator that is provided so as to correspond to the single first temperature sensor and receives a signal from the first temperature sensor and transmits a signal when temperature of the two switching devices is equal to or greater than a predetermined temperature,
  wherein the two switching devices are configured to forcibly turn OFF via the driver in response to the signal from the comparator.

2. The apparatus for controlling the heater in the vehicle according to claim 1, further comprising:
  a second temperature sensor that measures temperature of the heater;
  a voltage sensor that measures voltage applied to the heater; and
  a current sensor that measures current flowing through the heater,
  wherein the microprocessor receives signals from the first temperature sensor, the second temperature sensor, the voltage sensor and the current sensor, and
  wherein the microprocessor includes a forcibly turning OFF instruction unit that is configured by software to issue a forcibly turning OFF instruction to the driver when any one of temperature of the two switching devices, temperature of the heater and voltage and current to the heater exceeds their corresponding predetermined values.

* * * * *